United States Patent [19]
Vo-Dinh

[11] Patent Number: 4,999,810
[45] Date of Patent: Mar. 12, 1991

[54] SURFACE-ENHANCED RAMAN OPTICAL DATA STORAGE SYSTEM

[75] Inventor: Tuan Vo-Dinh, Knoxville, Tenn.

[73] Assignee: Martin Marietta Energy Systems, Inc., Oak Ridge, Tenn.

[21] Appl. No.: 423,995

[22] Filed: Oct. 19, 1989

[51] Int. Cl.$^5$ ............... G11C 13/04; G11C 13/00; G11C 11/00
[52] U.S. Cl. ........................... 365/124; 365/119; 365/151
[58] Field of Search .............. 365/124, 151, 119; 356/301

[56] References Cited

U.S. PATENT DOCUMENTS

| | | | |
|---|---|---|---|
| 4,032,901 | 6/1977 | Levinthal | 365/119 |
| 4,101,976 | 7/1978 | Castro et al. | 365/119 |
| 4,333,165 | 6/1982 | Swainson et al. | 365/119 |
| 4,434,477 | 2/1984 | Sander et al. | 365/124 |
| 4,674,878 | 6/1987 | Vo-Dinh | 356/301 |
| 4,802,760 | 2/1989 | Inoue et al. | 356/301 |
| 4,807,991 | 2/1989 | Carew | 356/301 |
| 4,812,036 | 3/1989 | Inoue | 356/301 |
| 4,832,483 | 5/1989 | Verma | 356/301 |
| 4,864,536 | 9/1989 | Lindmayer | 365/119 |

OTHER PUBLICATIONS

"Micro Chips" by T. A. Heppenheimer, *Popular Science*, Dec. 1986, pp. 64–69.
Bell, A. E., Recent Developments in Optical Storage Technology, *Nature*, vol. 297, May 13, 1982, pp. 104–106.
Bell, A. E., Optical Discs for Information Storage, *Nature*, vol. 287, Oct. 16, 1980, pp. 583–585.

*Primary Examiner*—Stuart N. Hecker
*Assistant Examiner*—Michael A. Whitfield
*Attorney, Agent, or Firm*—J. A. Marasco; Bruce M. Winchell

[57] ABSTRACT

A method and apparatus for a Surface-Enhanced Raman Optical Data Storage (SERODS) System is disclosed. A medium which exhibits the Surface Enhanced Raman Scattering (SERS) phenomenon has data written onto its surface of microenvironment by means of a write-on procedure which disturbs the surface or microenvironment of the medium and results in the medium having a changed SERS emission when excited. The write-on procedure is controlled by a signal that corresponds to the data to be stored so that the disturbed regions on the storage device (e.g., disk) represent the data. After the data is written onto the storage device it is read by exciting the surface of the storage device with an appropriate radiation source and detecting changes in the SERS emission to produce a detection signal. The data is then reproduced from the detection signal.

19 Claims, 3 Drawing Sheets

SURFACE-ENHANCED RAMAN OPTICAL DATA STORAGE SYSTEM

The U.S. Government has rights in this invention pursuant to Contract No. DE-AC05-84OR21400 with Martin Marietta Energy Systems, Inc., awarded by the U.S. Department of Energy and funded through the Office of Health and Environmental Research.

FIELD OF INVENTION

The present invention relates to optical data storage, and in particular optical data storage based on the phenomenon of Surface-Enhanced Raman Scattering (SERS).

BACKGROUND OF THE INVENTION

For the last three decades, magnetic data storage has remained the cornerstone for machine-readable data storage. In the 1970's, research efforts were devoted to investigate new generations of data storage devices based on nonmagnetic principles, such as optical data storage systems. Whereas magnetic data storage disks provide excellent access time and erasability, optical data storage systems can provide a unique combination of superior performance features that make them most appropriate for large memory applications. Optical data storage disks promise to offer low cost-per-byte, improved accessing characteristics and higher storage efficiency.

Due to the importance of large-memory systems, there is a strong need to develop new types of data storage systems that have the potential to be efficient and cost effective. A variety of nonalterable read-only optical data storage media have been proposed and developed. Spectro-chemical methods, such as the "hole-burning" technique, have been suggested for optical data storage.

The SERS phenomenon has received great interest in fundamental research and more recently in applied studies. Most of the SERS investigations have involved spectroscopic studies of chemical compounds. However, no known systems use the SERS effect for data storage.

Therefore it is an object of this invention to provide a system for high density optical data storage based on the SERS effect. It is an additional object of this invention to provide a SERS-based system for random access read/write optical data storage applications.

SUMMARY OF THE INVENTION

The present invention provides for a method and apparatus for a Surface-Enhanced Raman Optical Data Storage System (SERODS). The method requires a SERS-emissive storage device which will emit a SERS signal when excited. During a write-on procedure, the surface, or microenvironment, of the storage device is disturbed in a manner corresponding to the data to be stored. The disturbed regions of the storage device exhibit changed SERS-emitting characteristics when excited. During a read-on procedure, the surface or microenvironment of the storage device is excited by directing light of an appropriate wavelength upon the storage device. The SERS emission signal of the storage device is then detected and a signal corresponding to the stored data is produced. The term microenvironment infers that the SERS active region may be at the surface or subsurface of the storage medium.

A preferred embodiment of this invention is an apparatus for a SERODS system. The preferred embodiment comprises a storage means with a surface which will emit a SERS signal when excited and a write on means which will disturb the surface of the storage means and result in changed SERS emission characteristics when the surface of the storage device is excited. The write-on means is controlled in a manner so that the disturbed regions represent the data to be stored.

In the preferred embodiment, the storage means is made of support means and a SERS-active support layer disposed on the support means. A SERS-emitting optical layer is disposed on the SERS-active support layer. The preferred SERS-emitting optical layer is an organic or inorganic chemical which will emit a SERS signal when excited.

The preferred SERS-active support layer is made of two layers. The first layer is a SERS-active substrate which is disposed evenly over the surface of the support means and the second is a metal layer disposed evenly over the substrate.

The preferred write-on means is a laser of sufficiently high intensity to disturb the substrate to modify the molecular interactions thereof that affect the SERS process. Other possible write-on means, such as a thermal or electromagnetic beam, or mechanical device could be used.

In the preferred embodiment, an optically transparent protection means is disposed over the SERS-emitting optical layer after the write-on procedure has been accomplished. This protection means preserves the surface of the storage device and protects against accidental write-on and contamination.

In the preferred device for reading data stored on a SERS storage device, the surface of the storage device is illuminated with excitation means which causes the optical layer of the storage device to emit a SERS signal. The SERS emission signal, corresponding to the stored data, is detected by detection means and the data is reproduced from a signal generated by the detection means. The excitation means is a laser of an appropriate wavelength to cause a SERS emission signal from the surface of the storage device.

In the preferred embodiment the SERS storage device is capable of three-dimensional data storage. In such an embodiment, the storage device is constructed of a plurality of SERS active optical systems. The write-on means and the excitation means are focused onto the desired layer to write and read the data, respectively.

The method and apparatus of the present invention presents many advantages over the prior art in the field of optical data storage. The SERS phenomenon is molecular in nature and, theoretically, one molecule of the substrate could store one bit of data; the practical storage capacity is limited only by the ability to detect the SERS signal.

Another advantage arises in the field of security of the stored data. Since the SERS effect is wavelength dependent, the combined choice of the optical layer, the excitation device for the read-on procedure and the specific detection system could be selected so that only the SERS signal of a certain wavelength contains the stored data. With a choice of excitation devices of various wavelengths and optical layers with various SERS emission characteristics the data stored on a SERS storage device could only be retrieved if the necessary information as to the storage procedure was known.

SERODS systems are also appropriate for three-dimensional storage of data by layering SERS storage devices or providing a medium having SERS species embedded therein in a three-dimensional manner and selectively focusing the write-on and excitation devices so that the selected layer of SERS storage device is affected.

BRIEF DESCRIPTION OF THE INVENTION

The present invention may be best understood by reference to the following Detailed Description of an exemplary embodiment when considered in conjunction with the drawings in which.

DETAILED DESCRIPTION OF THE INVENTION

Figure 1:
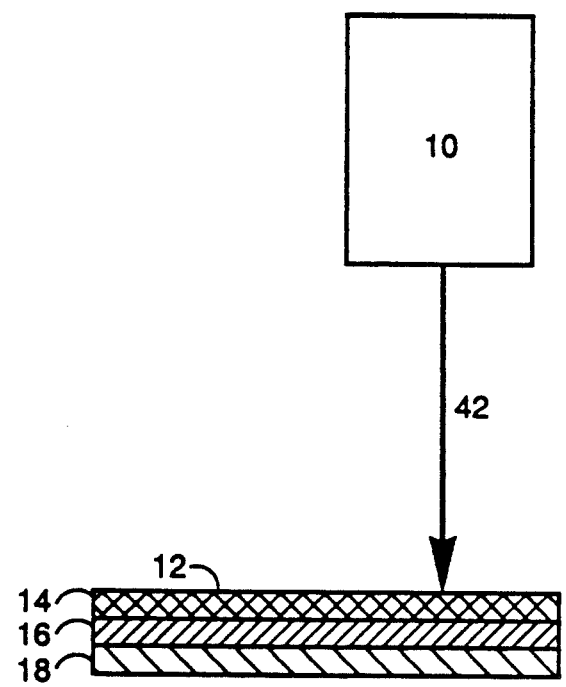
FIG. 1 is a block schematic and diagram showing the structure of the storage device during the write-on procedure.

Referring now to the drawings in which like reference characters designate like or corresponding parts throughout the figures, there is shown in FIG. 1 an apparatus for writing data onto a SERS storage device 12. The SERS storage device 12 is shown in cross-section and comprises three individual layers: first is a disk support 18, second is a SERS-active support layer 16, and third is an optical layer 14. The optical layer 14 is an organic or inorganic chemical, such as benzoic acid, which, when disposed adjacent to a SERS-active support layer 16, will emit a SERS signal when excited; this SERS emission signal is highly dependent upon the morphology of the SERS-active support layer 16 adjacent to the optical layer 14. If the morphology of the SERS-active support layer 16 is changed, the emission of a SERS signal by the optical layer 14, when excited, will be changed substantially.

Figure 2:
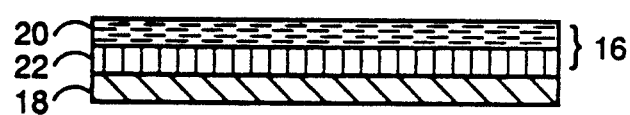
FIG. 2 is a diagram showing the structure of a SERS-active support layer in detail.

The SERS storage device may be constructed by providing a disk support 18 such as a plastic disk. A SERS active support layer 16 may then be placed on the surface of the disk. Referring to FIG. 2 the structure of the SERS-active support layer 16 may be described in detail.

A substrate 22 must first be evenly distributed on the disk support 18. Microbodies such as polystyrene, titania or fused silica spheres or microparticles may be placed into suspension in a solution. 100 $\mu$l of the solution may then be placed on the disk support 18. The disk 18 is then spun at 800 rpm for 100 seconds in order to assure an even distribution of the spheres over the surface of the disk support 18. Once the substrate 22 has been applied, a suitable metal layer 20 is applied to complete the SERS-active support layer 16. After allowing the substrate 22 to dry, the disk support 18 may be placed inside a vacuum chamber in order to allow the metal layer 20 to be thermally evaporated onto the substrate 22.

Once the support 18 has been provided with a suitable SERS-active support layer 16, the optical layer 14 must be provided. This may be accomplished by depositing 4 $\mu$l of a 0.01 M solution of benzoic acid on the SERS-active support layer 16.

Once the SERS storage device has been constructed, a method for reading and writing the data onto the device is necessary. Referring to FIG. 1, the write-on procedure is best accomplished using a laser for a write-on device 10. The laser beam 42 disturbs, by thermal and/or other means, the morphology and other molecular interactions of the SERS-active layer 16 which results in a change of SERS emission when excited. The write-on device 10 may also be a thermal beam, microwave beam, electron beam or a mechanical device capable of disturbing the morphology of the SERS-active layer 16.

Figure 3:
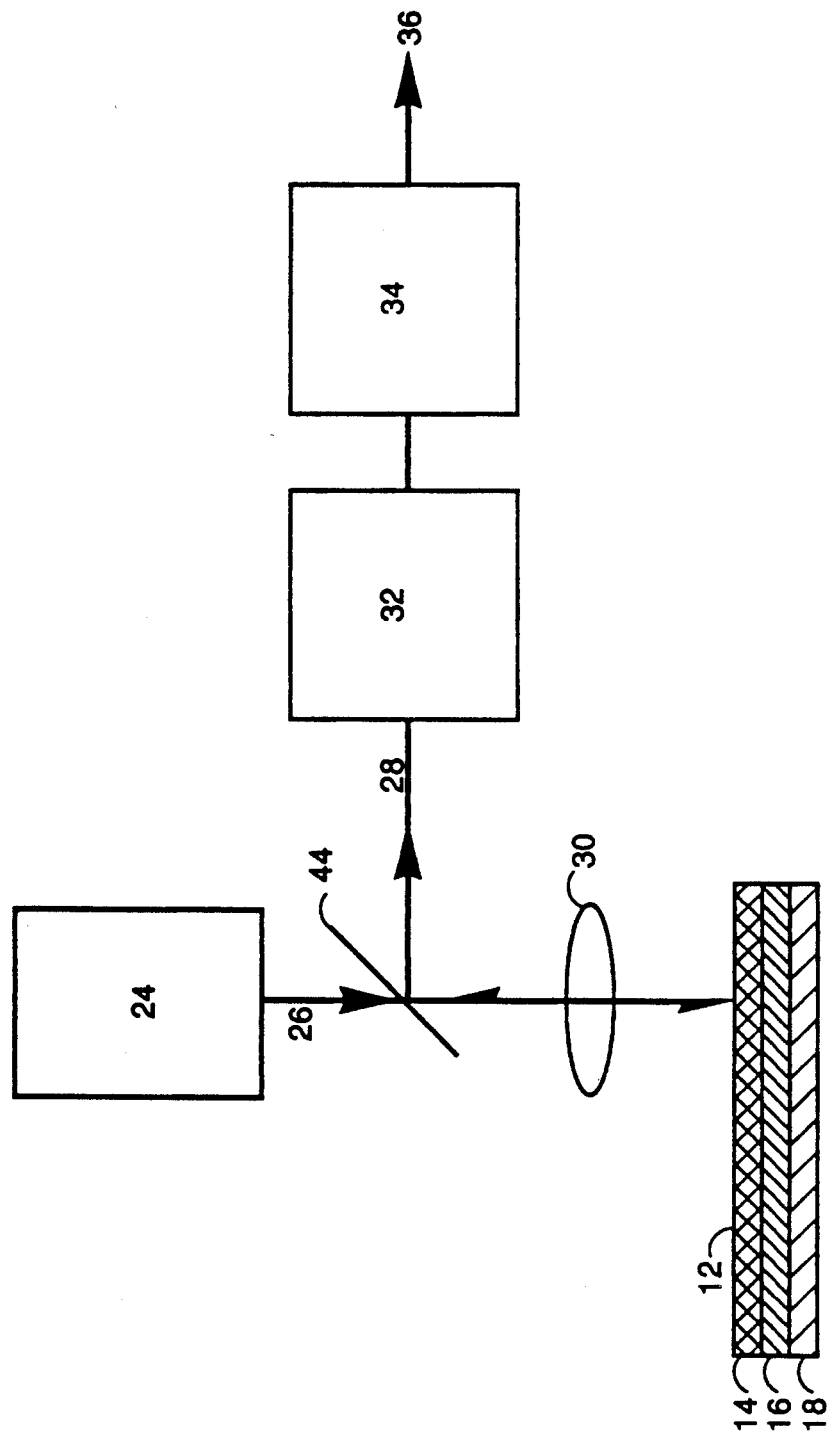
FIG. 3 is a block schematic and diagram showing the structure of the storage device during the read-on procedure.

Referring now to FIG. 3, the read out procedure may be described. An excitation device 24, such as a low power laser, projects a laser beam which passes through optics 30 and is directed to the surface of the storage device 12. The device will emit a SERS signal and any areas where the SERS-active layer 16 has been disturbed will be indicated by reduced SERS emission The SERS signal 28 is then directed by way of optics 30 and beam splitter 44 to a dispersive element 32 where the appropriate frequency of SERS signal may be selected; the selected SERS signal is then directed to a detector 34 which produces an output 36 used to reconstruct the data stored on the SERS storage device.

An example of a recording and reading system for optical data storage is described by A. E. Bell in "Optical Discs for Information Storage", Nature, v. 287, p. 583 (1980).

Figure 4:
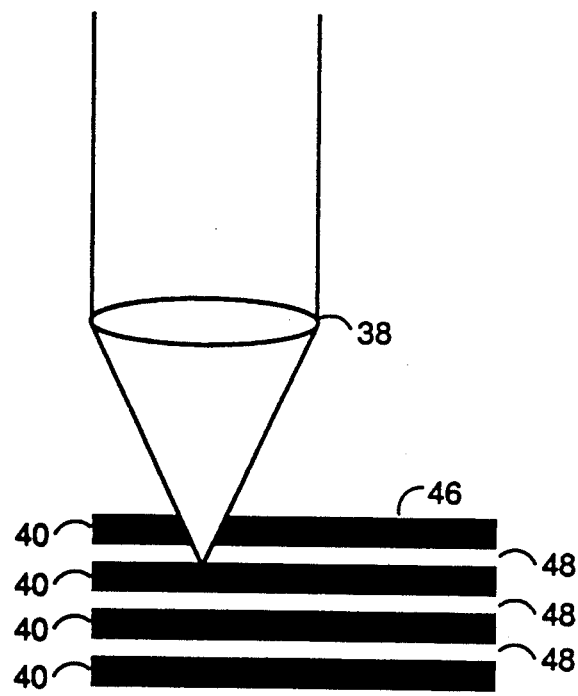
FIGS. 4 and 5 are diagrams of three-dimensional SERS-active storage devices.

FIG. 4 shows a configuration of a SERS storage device 46 capable of three-dimensional data storage. This storage device 46 would replace the storage device 12 in figures 1 and 3. In use, the write-on beam 42 of FIG. 1 or the excitation beam 26 of FIG. 3 would be directed through the optics 38 to be selectively focused so as to affect substantially a single layer of a SERS-active storage system 40. Each individual layer of a SERS-active storage system 40 would comprise a SERS-active storage device, as shown in FIG. 1, constituting an optical layer 14 and a SERS active layer 16. The individual layers 40 would be separated by an optically transparent support layer 48. A plurality of SERS-active storage systems would be layered to form a SERS data storage device 46 capable of three-dimensional data storage and retrieval.

Figure 5:
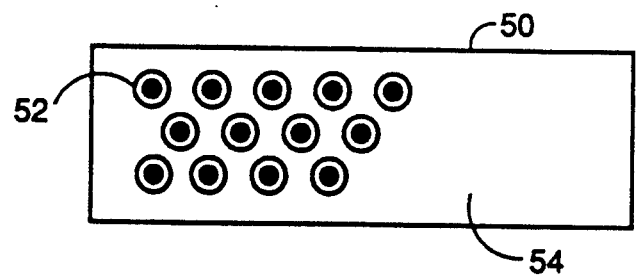

FIG. 5 shows another configuration of a SERS storage device 50 capable of three dimensional data storage. The operational characteristics are similar to that configuration shown in FIG. 4, but the construction is different. In this embodiment, SERS-active microbodies 52 are embedded in a three-dimensional fashion in a suitable matrix medium 54 such as epoxy resin, polyacrylamide and the like. The microbodies 52 can be comprised of a solid particle or a substrate particle coated with an optical species.

Although a preferred embodiment is described above, it is understood that the invention is capable of numerous rearrangements, modifications and substitution of parts without departing from the scope of the invention as defined by the appended claims.

I claim:

1. A method for the storage of data comprising the steps of:
   providing a Surface-Enhanced Raman Scattering (SERS) medium which has a microenvironment that will emit a SERS signal when excited;
   producing a data signal corresponding to the data to be stored; and disturbing the microenvironment of the SERS medium with the data signal corresponding to the data, so that the ability of the microenvironment to emit a SERS signal when excited is changed in regions of the microenvironment which have been disturbed, such regions representing the data.

2. The method of claim 1, wherein the step of disturbing the microenvironment further comprises the step of:
irradiating the microenvironment with a laser beam to modify the molecular interactions thereof that affect the SERS process.

3. The method of claim 1, wherein the step of disturbing the microenvironment further comprises the step of:
manipulating the microenvironment mechanically.

4. A method for reading data comprising:
providing a storage device having a SERS signal emissive microenvironment on which data has been stored;
exciting the microenvironment of the storage device with a laser and causing a SERS emission signal corresponding to the data stored thereon;
detecting the SERS emission signal; and
producing the data from the detected SERS emission signal.

5. An apparatus for the storage of data comprising;
storage means having a SERS medium with a microenvironment that will emit a SERS signal when excited; and
write-on means for producing disturbed regions on the microenvironment of the storage means that correspond to the data being stored, said disturbed regions having a changed SERS emission signal when excited as compared to undisturbed regions, such disturbed regions representing the data.

6. The apparatus of claim 5, wherein the storage means comprises:
support means having a surface;
a SERS-active support layer disposed on the surface of said support means; and
a SERS-emitting optical layer disposed on said SERS active support layer.

7. The apparatus of claim 6 further comprising:
optically transparent protection means disposed on the SERS signal emitting optical layer after the data is written on the storage device, whereby the surface of the storage means is protected from being accidentally disturbed or contaminated.

8. The apparatus of claim 6 wherein the SERS-active support layer comprises:
a SERS-active substrate deposited evenly on the surface of the support means; and
a metal layer deposited evenly over the SERS-active substrate.

9. The apparatus of claim 6 wherein the SERS signal emitting optical layer comprises:
an organic or inorganic chemical which will emit a SERS signal when excited, deposited evenly over the SERS-active support layer.

10. The apparatus of claim 5 further comprising:
three-dimensional storage means comprising a plurality of layered SERS-active optical systems; and
focusing means for directing the write-on means to disturb one of the SERS-active optical systems at a time, whereby individual layers of the SERS- active optical systems contain separate disturbed regions representing data.

11. The apparatus of claim 5, wherein said write-on means comprises:
a laser beam selectively focused on the microenvironment of the storage means for disturbing the molecular interactions thereof that affect the SERS signal.

12. The apparatus of claim 5, wherein said write-on means comprises:
a thermal beam selectively focused on the microenvironment of the storage means for disturbing the molecular interactions that affect the SERS signal thereof.

13. The apparatus of claim 5, wherein said write-on means comprises:
mechanical means for physically disturbing the surface of the storage means.

14. An apparatus for the reading of data comprising:
a storage device having a SERS signal emitting microenvironment with data stored thereon;
excitation means for exciting the SERS signal emitting microenvironment of the storage device and causing a SERS emission signal that corresponds to the data; and
detecting means for detecting the SERS emission signal corresponding to the data and producing the data.

15. The apparatus of claim 14, wherein the storage device is a three dimensional SERS storage device having data stored in a plurality of layers of SERS-active storage systems, further comprising:
focusing means whereby the excitation means is selectively focused in the three-dimensional SERS storage device to retrieve data stored in a particular layer of a SERS-active storage system.

16. The apparatus of claim 14, wherein said excitation means comprises:
a laser beam of an appropriate wavelength to cause SERS emission from the microenvironment of the storage device.

17. The apparatus of claim 14 wherein said excitation means comprise a microwave beam.

18. The apparatus of claim 14 wherein said excitation means comprise an electron beam.

19. A method for the storage and reading of data comprising:
providing a SERS medium which has a microenvironment that will emit a SERS signal when excited;
producing a data signal corresponding to the data to be stored;
disturbing the microenvironment of the SERS medium with the data signal corresponding to the data thereby changing the ability of the surface to emit a SERS signal in the disturbed regions, whereby such disturbed regions constitute stored data;
exciting the surface of the SERS medium with a laser and causing a SERS emission signal corresponding to the stored data thereon;
detecting the SERS emission signal; and
producing the data from the detected SERS emission signal.

* * * * *